Patented Feb. 9, 1937

2,070,133

UNITED STATES PATENT OFFICE 2,070,133

FLOTATION OF CEMENT COPPER

Harmon E. Keyes, Miami, Ariz.

No Drawing. Application June 30, 1934, Serial No. 733,249. Renewed July 3, 1936

5 Claims. (Cl. 75—2)

It is well known in the art that oxidized forms of copper may be recovered as high grade cement copper concentrate by leaching the ore with sulphuric acid, precipitating the dissolved copper with metallic iron in presence of the pulp and recovering the precipitated cement copper from the pulp by flotation. It is also known that the combination of dissolved iron salts such as exist in the above mentioned flotation circuit together with aeration occurring in flotation results in re-solution of cement copper to such an extent that means have been adopted for its prevention, such as are described in my Patent No. 1,971,416, dated Aug. 28, 1934.

I have found that in the flotation of cement copper in which middlings or cleaner rejects are produced, as in standard flotation practice and which require further concentration treatment to produce satisfactory end-products, such middlings or rejects become less amenable to flotation after re-circulation or further treatment in the flotation system, with the result that re-circulating loads of middlings are built up which eventually discharge largely into the tailings, thus causing excessive copper losses. I have also found that the above copper losses resulting from re-circulating products are caused by both re-solution and oxidation of cement copper and that even if re-solution is prevented oxidation of solid copper may take place, thus giving non-floatable products carrying copper values.

The invention here specified deals with a method of reconditioning cement copper flotation middlings or rejects before their return to the flotation circuit so that this copper is rendered amenable to recovery in the final flotation concentrate. It is not the intention to limit this method to any specific flow sheet or arrangement of the flotation cells as it is applicable to many types of flotation circuits and conditions. For example, in the usual rougher flotation system a single concentrate or a series of concentrates of varying grades may be taken and the grade of any or all of these may or may not be raised by subsequent cleaning operations. Also in cleaner operations rejects may be produced containing copper values. However, I have found that such products become less amenable to flotation by repeated aeration. According to this invention, any middling, reject or intermediate concentrate from any stage in the cement copper flotation may be treated so as to convert unfloatable oxidized or combined copper back to a floatable form and this product then returned to the flotation circuit so that the previously unfloatable copper in the middling is made amenable to flotation and is substantially recovered in the form of a final concentrate, either as a separate concentrate or as a part of the main concentrate. In contra-distinction to standard flotation practice and the known prior art, this reconditioning is not brought about by simply adding additional or different flotation reagents nor by freeing locked mineral grains be re-grinding, but is accomplished by effecting a change of chemical state of the copper which was caused to be refractory with respect to flotation as a result of previous aeration. This is preferably accomplished by re-forming, as finely divided cement copper, of metallic copper surfaces by chemical action, but may also be carried out by treatment which converts the refractory or non-floatable copper to a floatable form other than metallic, such as sulphide particles or sulphide-filmed particles.

It is the aim of this specification to disclose the fact that, in contrast to natural mineral substances, cement copper rapidly changes its original characteristics in the course of plant operations which involve aeration and as a result of this fact non-floatable or difficultly floatable copper compounds are formed and exist in the intermediate flotation products. In order, therefore, to produce a high grade concentrate and a low grade tailing in flotation these intermediate products require a special treatment before they ultimately find their way into the end products of the flotation system. The invention here described deals with the means adopted to convert the copper in these products back to a floatable form and also the general method involved in adding the intermediate products to the final end products of the flotation system.

When inhibiting re-solution by use of a basic precipitant between the stages of copper precipitation by iron and cement copper flotation, as described in my above mentioned patent, any copper remaining in solution, after contacting with iron, is almost completely precipitated as copper hydroxide by the basic precipitant. This copper hydroxide, being difficultly floatable, is at least partially floated in the rougher flotation treatment, but is dropped in the cleaner and this tends to accumulate in the cleaner rejects and intermediate concentrates and eventually is largely discharged into the tailing. In such cases the present invention finds an important application as by the treatment of intermediate flotation products herein disclosed the copper hydroxide is converted to a more floatable form, such as cement copper, and as a result of subsequent flotation is ultimately recovered as a high grade concentrate.

Still another feature of this invention is the recovery of copper initially in solution and not precipitated prior to flotation treatment. Certain portions of such dissolved copper are carried over mechanically into the concentrate as a part of the pulp solution and are by my method then converted to floatable copper in conjunction with the dissolved copper caused by re-solution in the system, which has been previously described.

Regardless of whether or not re-solution exists in the system or has been inhibited by use of a basic precipitant prior to cement copper flotation, or whether dissolved copper is initially present in flotation, the general means and method of reconditioning middlings here specified may be typically conducted as follows, and is subject to wide variation in manipulation without departing from the spirit and purpose of this invention.

The oxidized copper ore, after being ground in the desired fashion, say to 2% plus 48 mesh, may be given a preliminary flotation treatment for sulphide elimination, thickened to the desired degree, say to 50 per cent solids, leached with sulphuric acid by agitation, treated with metallic iron such as sponge iron or fine scrap in a suitable apparatus such as an agitator tank or revolving drum, conditioned for flotation by addition of suitable flotation reagents and perhaps a limited quantity of basic precipitant to complete the copper precipitation and also precipitate a certain portion of dissolved iron as ferrous hydroxide, and finally treated by flotation for recovery of copper. In this flotation treatment of cement copper a final tailing is produced, together with a final cement copper concentrate. With an original ore containing 1 per cent sulphide and 1 per cent oxide copper a final tailing of 0.1–0.2 per cent total copper may be produced simultaneously with a final concentrate of 55–80 per cent copper. The intermediate flotation products with which this invention is concerned may vary in grade anywhere between the value of the tailing and final concentrate. In a simplified operation a single rougher concentrate will be produced together with the final rougher tailing. This rougher concentrate, which may contain 15–30 percent copper, is then sent to a cleaner flotation cell where the final concentrate and a reject are produced. The method here claimed deals with treatment of this reject. This cleaner reject, which may contain 3–15 per cent copper and represent about 16 per cent of the total copper, may contain both dissolved and solid oxidized copper, the latter being either completely oxidized particles or films of copper oxide on the cement copper particles. In either case both the dissolved and oxidized forms of copper are converted to a floatable form, preferably finely divided cement copper. If conditions in the previous flotation have been conducive to re-solution of cement copper there will be a relatively large amount of dissolved copper present and the amount of solid oxidized copper may be relatively small or negligible. However, if re-solution has been prevented there may be an appreciable amount of solid oxidized copper or of oxide films present, in which case the hydrogen ion concentration of the pulp solution is raised by adding a limited quantity of acid and agitating (but not substantially aerating) the reject pulp. This treatment restores the metallic copper surface to the oxide coated particles, dissolves the completely oxidized particles and increases the copper in solution. The dissolved copper in the pulp is then precipitated as finely divided cement copper by contact with metallic iron, as in an agitator, drum or mill. By limiting the acid so added and avoiding aeration the copper oxide (and hydroxide if present) is dissolved in preference to the cement copper. After the dissolved copper has been precipitated in a floatable form the material, the copper content of which is now practically all amenable to flotation, is sent to a suitable place in the flotation circuit in which the copper is substantially recovered in the final concentrate and the gangue discarded. If the hydrogen ion content of the solution is sufficiently high in the reject as taken from the cleaner so that the oxide copper is converted to metallic by agitation with metallic iron then no addition of acid will be required. Also, in case of only slight oxide coatings the abrasive action occurring in the agitation treatment of the reject may give adequate conditioning of the solid particles. In case of sufficient capacity of the main metallic iron precipitating apparatus, as well as of the rougher flotation, my method is most simply conducted by adding the rejects in question to the feed of the metallic iron precipitating apparatus from whence it returns with the normal pulp advance to the head of the rougher flotation cell. The leached pulp entering the precipitators from the leaching agitators contains normally sufficient free acid to effect the dissolution of the oxide copper in the reject but not the cement copper. However, in certain cases this reject pulp may be given a separate acidification, agitation, contact with metallic iron and flotation according to local conditions and requirements. In such cases these secondary flotation products resulting may be end products in the system or they may be added to other flotation stages.

Without departing from the purpose of this invention some other precipitant, such as a sulphide, may supplement or replace the metallic iron in re-conditioning these rejects. In such case the dissolved copper is precipitated as a sulphide and the oxidized surfaces of the solid particles are filmed with sulphide, both types of particles then being amenable to the subsequent flotation treatment.

Summarizing this method, it has been found that re-circulation and aeration of cement copper products lower the floatability due to oxidation of cement copper, resulting in increased tailing losses. Such losses may be minimized by changing the chemical nature of the oxidized copper thus formed in the normally re-circulating products so that floatable forms are produced, the product then being given a subsequent flotation treatment for recovery of the copper and discarding of the gangue. Also, by such treatment dissolved and difficultly floatable forms of copper present in the original cement copper flotation feed and occurring in the recirculating products are also made readily floatable, and are thus recovered as a high grade final concentrate with the other copper present. Thus, this method may operate as an improvement on and in conjunction with the means for inhibiting re-solution of cement copper as described in the above patent and which causes to be produced certain oxidized forms of copper which are found in the so-called middling products.

I claim:—

1. In a method of recovering cement copper from an ore pulp by a leaching-precipitation-flotation process the steps of separating from the flotation system products intermediate the concentrate and tailing as to grade, the said products having had their floatability impaired by oxidation subsequent to the precipitation step, producing metallic copper surfaces upon said products, and recovering the metallic copper particles from the pulp by flotation.

2. In a method of recovering cement copper from an ore pulp by a leaching-precipitation-flotation process the steps of separating from the flotation system products intermediate the concentrate and tailing as to grade, the said products containing dissolved copper and copper oxidized subsequent to the precipitation stage, dissolving the oxidized copper, precipitating the dissolved copper, and recovering the copper values from the pulp by flotation.

3. A process of recovering cement copper from an ore pulp comprising treating said pulp by flotation to produce a final concentrate, a final tailing, and a product intermediate the grade of said concentrate and tailing and which contains cement copper oxidized by the action of air in the above treatment, separating said intermediate product, subjecting said intermediate product to a preferential chemical treatment whereby said oxidized copper is dissolved and re-converted back to a floatable form without substantially dissolving any contained metallic copper, and then recovering the copper values in the product by a flotation treatment.

4. A method of recovering cement copper from an ore pulp by a leaching-precipitation-flotation process, comprising inhibiting re-solution of the cement copper after the precipitation step, producing in the flotation stage a final concentrate, a final tailing, and a product intermediate the grade of said concentrate and tailing, separating the said intermediate product from the flotation system, adding an acid to the intermediate product to dissolve substantially only the oxide copper, agitating without aeration the acidified pulp, contacting said acidified pulp with metallic iron to thereby precipitate metallic copper from the solution, and subjecting said pulp to flotation treatment to recover the metallic copper value.

5. A method of recovering cement copper from an ore comprising leaching a pulp of an oxidized copper ore, precipitating the dissolved copper by metallic iron, subjecting the precipitated pulp to a flotation treatment to produce a final concentrate, a final tailing and a product intermediate the grade of said concentrate and tailing, separating said intermediate product from the flotation system, and reintroducing the product to the above described system at some point ahead of the precipitation stage.

HARMON E. KEYES.

Patent No. 2,070,133                                    Granted February 9, 1937

HARMON E. KEYES

The above entitled patent was extended October 2, 1951, under the provisions of the Act of June 30, 1950, for 6 years and 82 days from the expiration of the original term thereof.

*Commissioner of Patents.*

I claim:—

1. In a method of recovering cement copper from an ore pulp by a leaching-precipitation-flotation process the steps of separating from the flotation system products intermediate the concentrate and tailing as to grade, the said products having had their floatability impaired by oxidation subsequent to the precipitation step, producing metallic copper surfaces upon said products, and recovering the metallic copper particles from the pulp by flotation.

2. In a method of recovering cement copper from an ore pulp by a leaching-precipitation-flotation process the steps of separating from the flotation system products intermediate the concentrate and tailing as to grade, the said products containing dissolved copper and copper oxidized subsequent to the precipitation stage, dissolving the oxidized copper, precipitating the dissolved copper, and recovering the copper values from the pulp by flotation.

3. A process of recovering cement copper from an ore pulp comprising treating said pulp by flotation to produce a final concentrate, a final tailing, and a product intermediate the grade of said concentrate and tailing and which contains cement copper oxidized by the action of air in the above treatment, separating said intermediate product, subjecting said intermediate product to a preferential chemical treatment whereby said oxidized copper is dissolved and re-converted back to a floatable form without substantially dissolving any contained metallic copper, and then recovering the copper values in the product by a flotation treatment.

4. A method of recovering cement copper from an ore pulp by a leaching-precipitation-flotation process, comprising inhibiting re-solution of the cement copper after the precipitation step, producing in the flotation stage a final concentrate, a final tailing, and a product intermediate the grade of said concentrate and tailing, separating the said intermediate product from the flotation system, adding an acid to the intermediate product to dissolve substantially only the oxide copper, agitating without aeration the acidified pulp, contacting said acidified pulp with metallic iron to thereby precipitate metallic copper from the solution, and subjecting said pulp to flotation treatment to recover the metallic copper value.

5. A method of recovering cement copper from an ore comprising leaching a pulp of an oxidized copper ore, precipitating the dissolved copper by metallic iron, subjecting the precipitated pulp to a flotation treatment to produce a final concentrate, a final tailing and a product intermediate the grade of said concentrate and tailing, separating said intermediate product from the flotation system, and reintroducing the product to the above described system at some point ahead of the precipitation stage.

HARMON E. KEYES.

Patent No. 2,070,133  
Granted February 9, 1937

HARMON E. KEYES

The above entitled patent was extended October 2, 1951, under the provisions of the Act of June 30, 1950, for 6 years and 82 days from the expiration of the original term thereof.

*Commissioner of Patents.*

Patent No. 2,070,133                          Granted February 9, 1937

HARMON E. KEYES

The above entitled patent was extended October 2, 1951, under the provisions of the Act of June 30, 1950, for 6 years and 82 days from the expiration of the original term thereof.

*Commissioner of Patents.*